Dec. 13, 1949     F. E. JOHNSON     2,491,451
COWL FASTENER DEVICE
Filed July 14, 1944
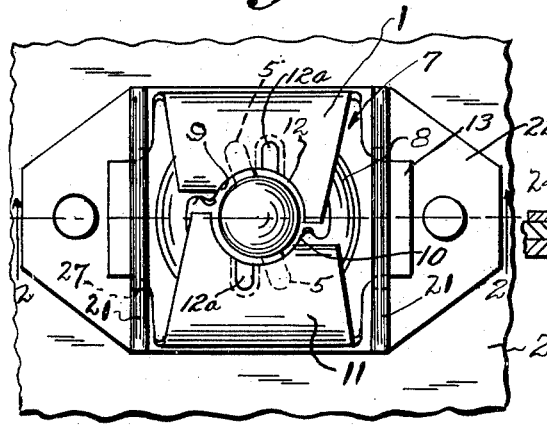
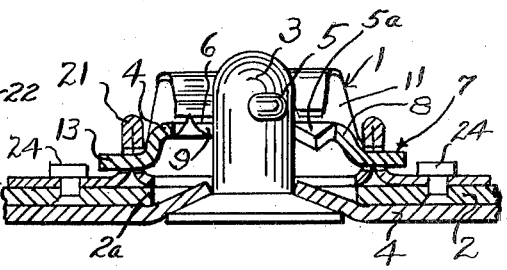
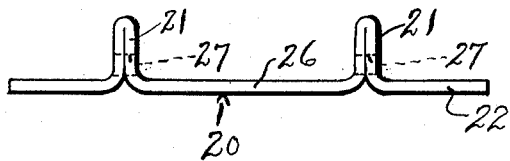
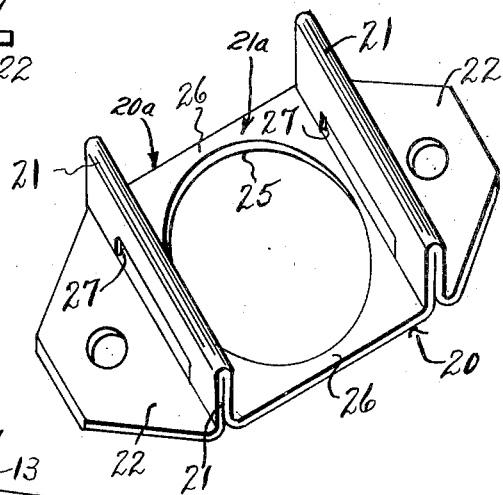
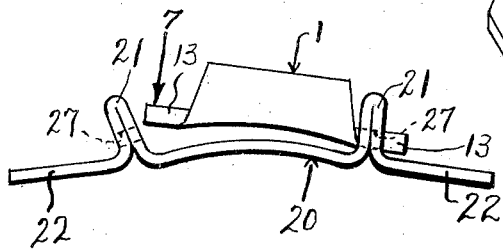
Inventor
Frank E. Johnson
By Walter P. Jones
Attorney Patented Dec. 13, 1949

2,491,451

UNITED STATES PATENT OFFICE 2,491,451

COWL FASTENER DEVICE

Frank E. Johnson, Malden, Mass., assignor to United-Carr Fastener Corporation, Cambridge, Mass., a corporation of Massachusetts Application July 14, 1944, Serial No. 544,981

2 Claims. (Cl. 24—221)

The present invention relates to improvements in rotary operative type fasteners such as those employed for connecting airplane cowling sheets together, and aims generally to improve existing fasteners of that type.

More particularly the invention provides an improved and simplified construction of female fastener member and attaching plate therefor whereby the female fastener member which comprises a stud-engaging part may be floatingly and shiftably mounted upon an apertured support.

One of the primary objects of the invention is the provision of improved attaching means for shiftably mounting a stud-engaging part in an apertured support which is exceedingly strong to resist all normal forces tending to displace the stud-engaging part from the support and yet is extremely light in weight so as not to materially increase the weight of the installation.

A further object of the invention is the provision of an improved construction of the type referred to above, wherein the several parts may be separately heat-treated and plated and thereafter may be quickly assembled without permanent distortion of the parts so as to be applied to the supporting structure as a unit.

Illustrative of the invention reference is made to the accompanying drawing showing one preferred form of the invention and in which Fig. 1 is a plan view of the fastening as viewed from the female fastener side thereof and illustrating my improved fastener member and mounting;

Fig. 2 is a longitudinal central sectional view thereof as taken on the line 2—2 of Fig. 1;

Fig. 3 is a side elevation of the attaching member;

Fig. 4 is a perspective view of the attaching member; and

Fig. 5 is a side elevation illustrating the manner of flexing the attaching member to permit assembly of the stud-engaging part therewith.

Referring more particularly to the drawings, the invention provides new and improved means for shiftably attaching a female socket or fastener member to a suitably apertured support, such as an airplane cowling sheet, though it is to be understood that the invention is susceptible of general application and is not restricted to such use.

Rotary operative fasteners, such as those used for securing airplane cowling sheets together, usually include a female fastener or socket member 1 suitably attached to one side of a supporting sheet 2 having an aperture 2ª and adapted to receive and interlock with a rotary male fastener member 3 rotatably mounted in a part 4 to be secured to the support 2. The rotary male fastener element preferably is formed with lateral projections or extensions 5, such as radial arms adapted to overlie and be engaged with a locking seat 6 of the female fastener member 1 upon rotary or turning movement of the male member 3. The seat 6 is spaced outwardly from the support 2, and thus when engaged by the extensions 5, the support 2 and part 4 are held in rigid fastened relationship.

The female fastener member may be of any approved type and construction to receive and lockingly cooperate with the rotary male element 3. In the illustrated form of the invention, the socket member 1 may be of the type disclosed and claimed in the U. S. patent of William A. Bedford, No. 2,306,928, granted December 29, 1942.

Such socket members advantageously comprise a base portion 7 formed with an outwardly dished embossment 8 having a central aperture 9 to receive the end of the stud or male member 3. The aperture 9 is preferably formed with radial elongations 10 to permit the passage of the radial arms 5 of the stud 3. The marginal edges of the apertures 9 and 10 present upwardly sloping cam elements 5ª (Fig. 2) for camming the arms 5 into engagement with the seats 6 when the stud 3 is rotated. Resilient wings 11 may extend from the base 7 upwardly and inwardly over the seats 6, the inner edges thereof being notched as at 12 to permit the passage of the end of the stud 3. The wings 11 have depressed portions 12ª adjacent the notches 12 extending toward the base portion 7. When the male member or stud 3 is rotated to fasten the parts, the extensions 5 ride under the depressed portions 12ª against the resiliency of the wings 11 and lock behind the depressed portions 12ª as shown in Fig. 1.

Such socket members or stud-engaging parts are preferably heat-treated to increase their strength and resistance to distortion under stress and may be plated to provide smooth working surfaces and preferably such heat-treating and plating of this part is done prior to assembly with any other part.

The invention provides an improved attaching means or plate for mounting the female socket member or stud-engaging part and shiftably attaching it to the apertured support 2 so that the apertured seat 6 of the stud-engaging part may be shiftable relative to the aperture of the support 2 to facilitate aligning the stud-engaging part with the stud 3 of the part 4 to be secured to the support.

Heretofore such attaching means have been metal plate members of sufficient thickness to mount the stud-engaging part securely on the support and usually they must be assembled with the stud-engaging part prior to heat-treatment and plating.

According to the invention, the improved attaching means comprises an elongated thin bearing plate 20 which may be of substantially thinner stock, for example, approximately one-half the thickness of the stock of the stud-engaging part, so as to reduce the weight of the fastening to a minimum.

The plate 20 may conveniently be rectangular in form and shaped to provide a channel section 20ª having outwardly extending flanges 21 and an intermediate web or body portion 21ª. Advantageously the flanges 21 may be formed by reversely bending the metal of the plate, as illustrated in Fig. 4, to provide reinforced or double thickness flanges providing adequate strength to the attaching means in the regions of greatest strain. This manner of forming the flanges also provides end fastening portions or ears 22 outwardly of the flanges 21 which may be apertured as at 23 for the reception of rivets or like fastenings 24 at spaced points along the median line of the attaching plate. The central web or body portion of the attaching plate, i. e. the portion intermediate the flanges, is apertured as at 25 to permit the passage of the stud 3 therethrough, and preferably this aperture 25 is sufficiently large to provide relatively narrow marginal side portions 26 connecting the flanges 21. These side portions, because of their narrow width and thinness, are flexible and may be readily bent or flexed to increase the distance between the flanges as shown in Fig. 5, notwithstanding that the plate has been heat-treated.

The flanges 21 provide retaining means for the stud-engaging fastener member 1, the base 7 of which is preferably formed with longitudinal extensions 13, the overall length of which exceeds the normal distance between the flanges. The flanges are slotted as at 27 adjacent the plane of the tops of the side portions 26 to receive loosely the extensions 13. The slots 27 are of greater length than the width of the extensions so that the latter may have transverse shifting movement therein. Similarly the spacing between the flanges is greater than the length of the base 7 so that the stud-engaging part may be shifted slightly over the aperture 25 of the attaching member 20.

The attaching member 20 may be manufactured completely to its finished form, heat-treated and plated as a single part separate from the stud-engaging part.

After the stud-engaging part 1 and the attaching member 20 have been completely formed, heat-treated and finished, they may be assembled merely by flexing the flexible side portions 26 as indicated in Fig. 5. The distance between the slotted portion 27 of the flanges 21 is thus increased, along a line tangent to the outer surface of the web 21ª, permitting the extensions 13 of the stud-engaging part 1 to be inserted in the slots 27. The resilience of the heat-treated metal returns the side portions 26 to their normal position as shown in Fig. 3 with the flanges perpendicular to the web of the attaching member 20, and in this position the stud-engaging part is retained by the flanges.

The advantages of the present invention reside in the simplicity of construction of a shiftably mounted rotary operative fastener member. The construction permits the utilization of extremely thin sheet metal for the attaching member which normally would be inadequate to withstand the strains and stresses to which the installation is subjected. However, in forming the retaining flanges 21 of double thickness material as described, and positioning them inwardly of but adjacent to the fastening ears 22, an extremely strong construction is provided which effectively resists deformations even when subjected to unusually heavy loads.

Although I have illustrated and described one preferred embodiment of my invention, I do not wish to be limited thereby because the scope of my invention is best defined in the following claims.

I claim:

1. An attaching member for shiftably mounting on an apertured support a stud-engaging fastener part having a base with longitudinal extensions thereon, said attaching member comprising an elongated plate of thin heat-treated sheet metal having a body portion provided with apertured end portions for the reception of fastening means for securing said attaching member to the support, said plate being formed with double walled flanges extending outwardly therefrom intermediate said body and apertured end portions and spaced apart a distance less than the overall length of the stud-engaging part base extensions, said flanges having apertures therein adjacent the plane of said plate for the reception of the stud-engaging part base extensions and said body portion intermediate said flanges being apertured to provide flexible marginal side strips connecting said flanges, whereby flexing of said side strips increases the distance between said flanges to permit insertion into the apertures thereof of the longitudinal extensions of said stud-engaging fastener part.

2. An attaching member for shiftably mounting a stud-engaging fastener part having a base with longitudinal extensions thereon on an apertured support, said attaching member comprising an elongated plate of thin heat-treated sheet metal having a body portion and apertured end portions for the reception of fastening means for securely attaching said attaching member to the support, said plate being reversely bent upon itself intermediate said end portions and said body portion to form outwardly extending integral double walled flanges disposed inwardly of the apertured end portions and spaced apart a distance less than the overall length of the stud-engaging part base extensions, said flanges being provided with apertures adjacent the plane of said plate for the reception of the stud-engaging part base extensions, and said body portion intermediate said flanges being apertured to provide flexible marginal side strips connecting said flanges, whereby flexing of said side strips increases the distance between said flanges to permit assembly of said attaching member with a stud-engaging fastener part.

FRANK E. JOHNSON.

REFERENCES CITED

The following references are of record in the file of this patent:

UNITED STATES PATENTS

| Number | Name | Date |
| --- | --- | --- |
| 2,322,614 | Bedford | June 22, 1943 |
| 2,356,412 | Jones | Aug. 22, 1944 |
| 2,389,121 | Churchhill | Nov. 20, 1945 |